US008887037B1

(12) United States Patent
Cook (10) Patent No.: US 8,887,037 B1
(45) Date of Patent: Nov. 11, 2014

(54) SCROLL-FREE USER INTERFACE AND APPLICATIONS

(76) Inventor: Douglas Cook, San Francisco, CA (US)

(*) Notice: Subject to any disclaimer, the term of this patent is extended or adjusted under 35 U.S.C. 154(b) by 234 days.

(21) Appl. No.: 12/276,374

(22) Filed: Nov. 23, 2008

Related U.S. Application Data (60) Provisional application No. 60/990,766, filed on Nov. 28, 2007.

(51) Int. Cl.
*G06F 17/00* (2006.01)

(52) U.S. Cl.
USPC ........... 715/208; 715/201; 715/202; 715/203; 715/204; 715/205; 715/206; 715/207; 715/781; 715/782; 715/783; 715/784; 715/785; 715/786; 715/787; 715/803; 704/9

(58) Field of Classification Search
USPC ......... 715/803, 243–247, 781–787, 201–208; 704/9
See application file for complete search history.

(56) References Cited

U.S. PATENT DOCUMENTS

| | | | |
|---|---|---|---|
| 6,938,218 B1* | 8/2005 | Rosen | 715/850 |
| 7,293,243 B1* | 11/2007 | Ben-Shachar et al. | 715/781 |
| 2006/0101003 A1* | 5/2006 | Carson et al. | 707/3 |
| 2007/0005576 A1* | 1/2007 | Cutrell et al. | 707/3 |
| 2007/0185843 A1* | 8/2007 | Jones et al. | 707/3 |
| 2007/0226640 A1* | 9/2007 | Holbrook et al. | 715/765 |
| 2011/0295827 A1* | 12/2011 | Genser | 707/706 |
| 2012/0042277 A1* | 2/2012 | Lin-Hendel | 715/784 |

OTHER PUBLICATIONS

Samhaa R. El-Beltagy, Wendy Hall, David De Roure, and Leslie Carr "Linking in Context" Published 2001 pp. 151-160.*

* cited by examiner

*Primary Examiner* — Quoc A Tran
(74) *Attorney, Agent, or Firm* — McCormick, Paulding & Huber LLP (57) ABSTRACT

A scroll-free user interface comprises a display area; an interface panel included within the display area; and a data panel. The data panel includes a portion of a set of data items. The size and number of data items in the portion of the set of items is based on the size of the data panel. A user interface comprises a display area; an interface panel included within the display area; a first user interface control; and a layered user interface element. Web pages are analyzed to identify associated electronic documents. A retrieved web page is analyzed to identify at least one dynamic element. The dynamic element is analyzed to determine a network location of at least one associated electronic document. The dynamic element may be analyzed by applying a pattern matching or by executing the dynamic element to identify the network location of at least one associated electronic document.

14 Claims, 7 Drawing Sheets

SCROLL-FREE USER INTERFACE AND APPLICATIONS

CROSS-REFERENCE TO RELATED APPLICATIONS

This application claims priority to U.S. Provisional Patent Application No. 60/990,766, filed Nov. 28, 2007, and entitled "Scroll-Free User Interface and Applications", which is incorporated by reference herein for all purposes.

BACKGROUND

This invention relates to the field of user interfaces for search engines and other information retrieval and presentation systems. Search engines are online or offline applications that receive queries from users or other applications and return search results listing one or more search results including information potentially relevant to the queries. Often, the search results will include hundreds or thousands of different items, such as web pages, electronic documents, and/or data files or data objects, that are potentially relevant to a given query. Users or applications must then evaluate each item to decide whether the item includes some or all of the information desired.

Search engines typically rank items in a search result according to the search engine's estimate of the items relevance to the query, with the most relevant items ranked highest. User interfaces for search engines then present the items in a search result to users with the most relevant or highest ranked items presented first. Typically, the user interfaces for a search engine present only a subset of the items in a search result to users. The number of items in a subset of search results is typically fixed, based on user or search engine preferences. If there are more items in a subset than are capable of being displayed on the user's window or display, then the user must use a scroll function or scroll user interface element to view all of the items in a subset of search results. This increases the time, coordination, and effort required to view and evaluate items in a search results.

If the current subset of items in a search result do not include the desired information, then the user may access one or more additional subsets of items in the search result by selecting a user interface element, such as a forward or reverse arrow or an index number associated with a particular subset. Often, these user interface elements may be located at the bottom of a window or subset of items in the search result. Because of this, a user may have to scroll the window or display to access these user interface elements to select a different subset of items in the search results. This further increases the time, coordination, and effort required to view and evaluate items in a search results.

Additionally, after submitting a search query, a user may want to refine the query to narrow or restrict the search to particular types of information. Typical search engine interfaces require users or applications to identify additional terms or restrictions and manually add these to their previous queries. Often, users may not know which additional terms or restrictions would be the most helpful for narrowing or refining their search queries. This makes searching for information more difficult and time consuming.

Thus, there is an unmet need for a search engine interface that allows users to quickly and easily evaluate subsets of search results. There is also an unmet need for a search engine interface that allows users to quickly and easily select and access different subsets of search engine results. There is also an unmet need for a search engine interface that allows users to easily restrict or refine search queries to obtain relevant items.

BRIEF DESCRIPTION OF THE DRAWINGS

The invention will be described with reference to the drawings, in which.

In the drawing, the use of identical reference numbers indicates similar or identical components.

SUMMARY

A scroll-free user interface comprises a display area; an interface panel included within the display area; and a data panel. The data panel includes a portion of a set of data items. The size and number of data items in the portion of the set of items is based on the size of the data panel. A user interface comprises a display area; an interface panel included within the display area; a first user interface control; and a layered user interface element. Web pages are analyzed to identify associated electronic documents. A retrieved web page is analyzed to identify at least one dynamic element. The dynamic element is analyzed to determine a network location of at least one associated electronic document. The dynamic element may be analyzed by applying a pattern matching or by executing the dynamic element to identify the network location of at least one associated electronic document.

DETAILED DESCRIPTION

Figure 1:
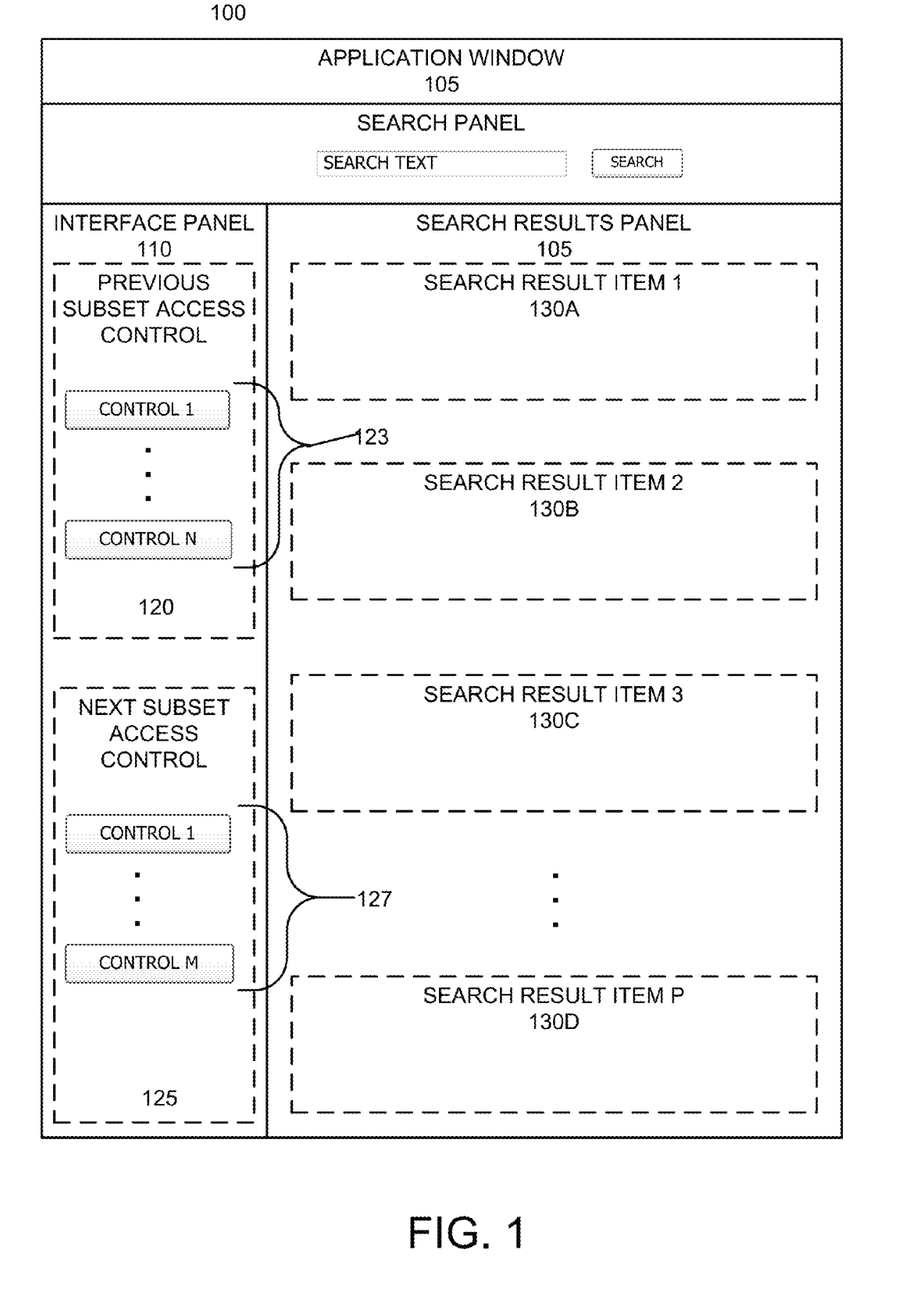
FIG. 1 illustrates an example scroll-free user interface according to an embodiment of the invention.

FIG. 1 illustrates an example scroll-free user interface 100 according to an embodiment of the invention. Scroll-free interface 100 allows users to quickly and easily navigate through subsets of search results. In an embodiment, scroll-free user interface 100 is presented by an application 105, such as a web browser or other type of application. The display area of the application 105 is partitioned into several panels or separate areas.

In an embodiment, the display area of application 105 is partitioned into at least an interface panel 110 and a search results panel 115. The search results panel 115 displays a subset of the search results. The search results may be generated dynamically or statically in response to a search query or other type of data access request. The subset of search results includes one or more search result items, such as search result items 1 to P, 130a to 130d, where P is any positive integer. Each search result item can include text, graphics, and/or animation providing information to the user. In a further embodiment, a search result item can include one or more hyperlinks or other references to additional information pertaining to the search result item. For example, a search result item can include a summary of an electronic document as well as a hyperlink to that electronic document. As discussed in detail below, a search result item can include one or more user interface elements in addition to hyperlinks.

In an embodiment, the number of search result items in a subset is determined by the size of the search results panel 115 and each of the search items, such that the entire subset is visible to the user without needing to scroll the window. If each search result item takes the same amount of vertical space, then an embodiment divides the vertical size of the search results panel 115 by the vertical size of a search result item to determine the number of search result items in a subset. In an embodiment, this determination is made dynamically based on the current window size of the application 105. In an alternate embodiment, a user may manually set the number of search result items in a subset so that an entire subset of search result items is visible within the search results panel 115.

In another embodiment, each search result item may have a different vertical size. In this embodiment, the total number of search results is dynamically partitioned into subsets based on the sizes of each search result item and the size of the search result panel 115, so that the search results panel 115 is filled with search result items for each subset of search results.

The interface panel 110 includes one or more controls, such as controls 120 and 125, for navigating through subsets of search results. In an embodiment, the interface panel 110 includes a previous subset access control 120 and a next subset access control 125. The previous and next subset access controls 120 and 125 allow users to view subsets of search results sequentially, by displaying the previous or next subset in a sequence of subsets of search results. Search result items can be arranged in a sequence according to properties of a search item, such as a record number or alphabetically according to a title or name property, or according to some external criteria, such as a search ranking providing a metric of each search result item's relevance to a query.

In further embodiments, the interface panel 105 can include additional access control for accessing subsets of search results, such as controls to access a particular subset directly, controls for accessing the first or last subset directly, number or letter controls to access a subset with a particular sequence position or beginning with a particular letter or letters. In an embodiment, the number and type of access controls, such as access controls 120 and 125 and any optional additional controls, may be determined dynamically based on properties of the search result.

In this example, the relatively large size of the access controls 120 and 125 and their fixed location on the application display make it easy for users to quickly navigate through search results. When combined with limiting the number of search result items displayed in the search results panel 115 to eliminate the need for scrolling windows, the speed and ease of navigation is greatly enhanced. Furthermore, the access controls 120 and 125 are positioned in close proximity to each other, making it generally easier to navigate through search results.

Figure 2A:
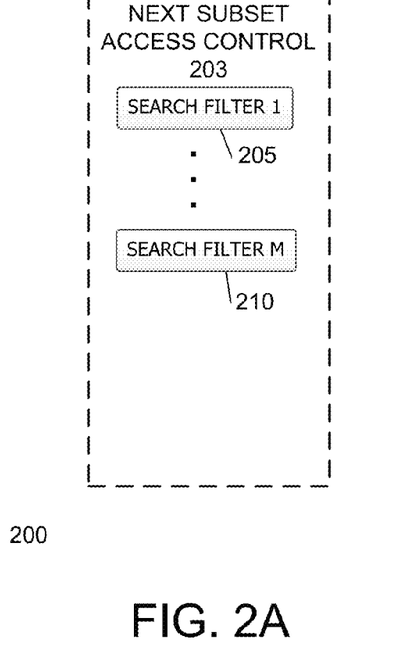
FIGS. 2A and 2B illustrate example layered active user interface elements according to an embodiment of the invention.
Figure 2B:
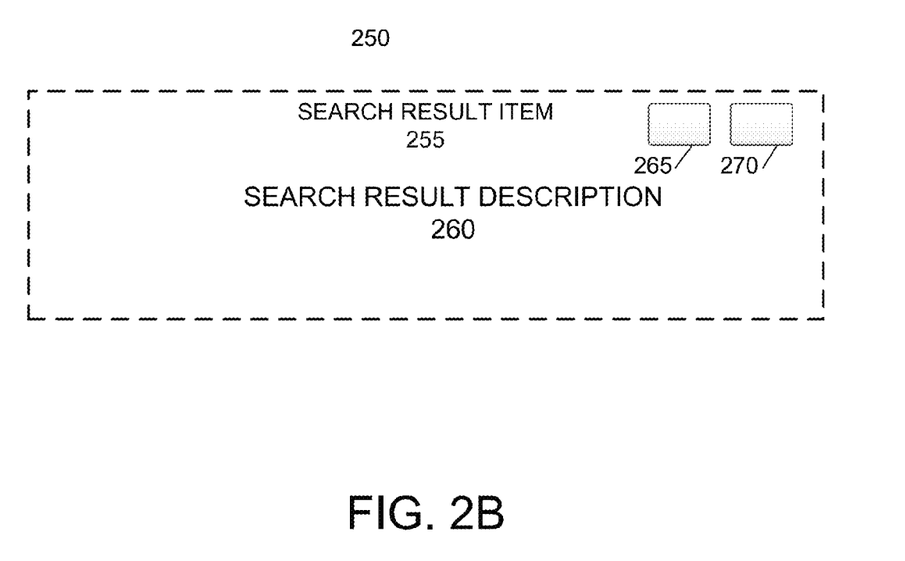

Additionally, the access controls, such as the previous subset access control 120 and the next subset access control 125 may be layered user interface elements that include additional controls. For example, the previous subset access control 120 includes N additional controls 123 and the next subset access control 125 includes M additional controls 127, where M and N are positive integers. FIGS. 2A and 2B illustrate example layered active user interface elements according to an embodiment of the invention.

A further embodiment of the invention uses a cache on the client-side to reduce the appearance of latency when accessing different subsets in a sequence of subsets of search results. The cache may also be used to improve performance when dynamically partitioning search results into subsets based on the sizes of each search result item and the size of the search result panel. In this embodiment, the application prefetches and caches additional search result in excess of the number of search results required for display. As users access different subsets of search results, search results are retrieved from the cache, if possible, rather than from a server application, database, or other source of search results. In still a further embodiment, asynchronous data communications techniques, such as asynchronous Javascript/AJAX or DHTML, are used to asynchronously retrieve and cache search results in the background.

FIG. 2A illustrates an example layered active user interface element 200. In this example, the layered active user interface element 200 includes a first user interface element 203, such as the next subset access control 120 shown in FIG. 1. Example layered active user interface element 200 includes one or more additional user interface elements layered on top of the first user interface element 203. In this example, the example layered active user interface element 200 includes at least user additional interface elements 205 and 210 on top of the first user interface element 200.

In an embodiment, a user can interact with both the first user interface element 203 and the additional user interface elements 205 and 210. For example, a user can select the first user interface element 203 to perform a first function and select additional user interface elements 205 or 210 to perform a second or third function.

For example, additional user interface elements 205 and 210 may be associated with search filters for narrowing a set of search results. By selecting the first user interface element 203, a user can access the next subset of search results. By selecting user interface element 205 and/or 210, a user can narrow the set of search results according to a criteria associated with the user interface element. Once the search results have been narrowed by one or more criteria, selecting the corresponding user interface elements again will remove this criteria and broaden the search results.

It should be noted that effects of layered user interface elements may be exclusive or cumulative. For example, selecting user interface element 205 may automatically deselect user interface element 210. Alternatively, selecting user interface element 205 may narrow the search results according to a first criteria and then selecting user interface element 210 further narrows the search results according to a second criteria. The user can select the first user interface element 203 to access the next subset of search results, as determined by the initial query and one or more user selected criteria.

In an embodiment, each of the additional user interface elements may include a guard band region. If the user attempts to make a selection within the guard band region, neither the first user interface element 203 or the additional user interface element is selected. In an embodiment, if the user attempts to make a selection anywhere within the layered user interface element 200 and outside of the guard band region or any additional user interface elements, then the first user interface element 203 will be selected.

In an embodiment, the number and type of additional interface elements can be determined dynamically based on the type and content of the search results. For example, if the search results correlate with a variety of wine, then additional user interface elements may be added to the layered active user interface element 200 to filter the search results to focus on the geographic region associated with the wine, reviews of this variety of wine, and/or producers or distributors of this variety of wine. In another example, if the search results correlate with a wine-growing region, then an embodiment of the invention may add additional user interface elements to the layered active user interface element 200 to filter the search results to focus on maps, tourism information, wine varieties, and/or wine producers in this region.

FIG. 2B illustrates another example layered active user interface element 250. In this example, the layered active user interface element 250 is a search result item, such as search result item 130a shown in FIG. 1. Example layered active user interface element 250 includes a first user interface element 255, which in this example is a search result item associated with a search result. For example, the first user interface element 255 may include a summary or description 260 of an electronic document associated with the search result item.

The example layered active user interface element 250 also includes one or more additional user interface elements, such as additional user interface elements 265 and 270. Additional user interface elements 265 and 270 may be associated with any type of function, such as a reference to a version of an electronic document translated to a different language (or to initiate an automatic translation of the electronic document to a different language). As discussed above, the additional user interface elements may be dynamically added to the layered active user interface element based on the content and context of the a particular search result item. In an embodiment, each of the additional user interface elements 265 includes a guard band regions as described above.

In an embodiment, a user can interact with both the first user interface element 255 and the additional user interface elements 265 and 270. For example, a user can select the first user interface element 255 to perform a first function, such as access the associated electronic document, and select additional user interface elements 265 or 270 to perform a second or third function, such as to access a translated version of the electronic document.

In an embodiment, a user may select anywhere within the layered active user interface element 250 that is outside of the additional user interface elements 265 and 270 (and any optional associated guard band regions) to select the first user interface element 255 and perform its corresponding function.

Figure 3:
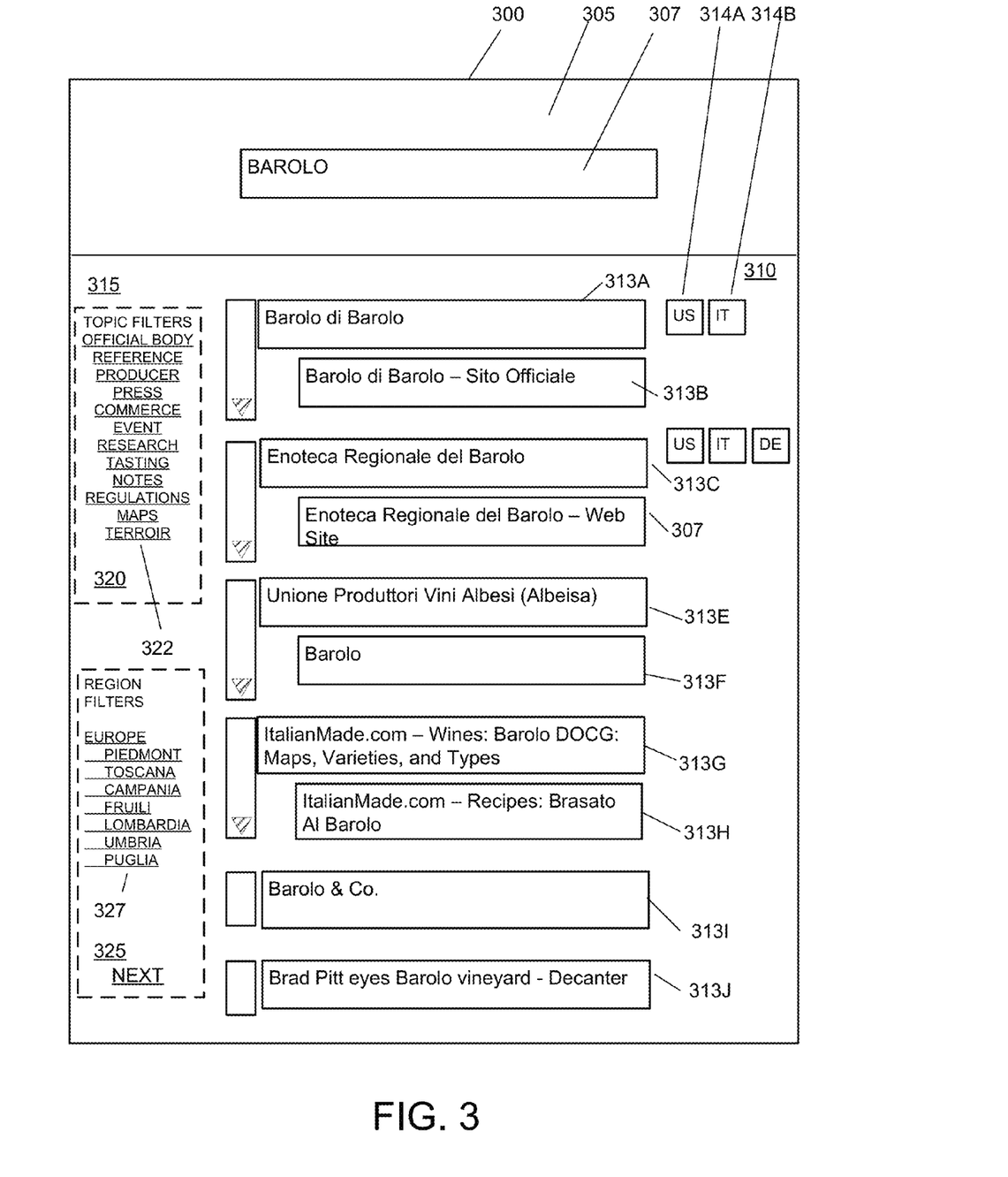
FIG. 3 illustrates an example implementation of a scroll-free user interface according to an embodiment of the invention.

FIG. 3 illustrates an example implementation of a scroll-free user interface 300 according to an embodiment of the invention. The example scroll-free user interface 300 is for a vertical search engine directed to the subject of wine. This example interface 300 is provided for the purpose of illustration and embodiments of the invention may be readily adapted to any type of online or offline application where users or other applications desire to navigate through sets or lists of data items.

Example user interface 300 is implemented within a web browser. Example user interface 300 includes a search panel 305 for receiving a search query from a user via search input box 307. In this example, a user has entered a query for "Barolo," a type of Italian wine.

Search results panel 310 includes a subset of search results including search result items 313a to 313j. In this example, each search result item provides a summary of an electronic document pertaining to the Barolo wines. In this example, the number of search result items in the subset of search results is selected so as to maximize the usage of the available space in the search results panel 310 without requiring the user to vertically scroll to view all of these search result items.

In this example, each search result item is a layered active user interface element providing a hyperlink with its associated electronic document. Additional user interface elements, such as user interface elements 314a and 314b, are added to each search result item to reference equivalent electronic documents in different languages.

Interface panel 315 includes access controls 320 and 325 for accessing the previous and next subsets of search results. In this example, the access control 320 and 325 are layered active user interface elements that include sets of additional user interface elements 322 and 327, respectively. The set of additional user interface elements 322 includes a set of topic filters that can be applied to narrow the search results to focus on a particular topic. In an embodiment, the topic filters in the set of additional user interface elements 322 may be determined dynamically based on the content of the user query, the content of the search results, and/or the context of the user query and search results. In this example, in response to the user query of "Barolo," the topic filters can include official bodies for this wine; reference material on this wine; wine producers; press and media articles about this wine; commercial entities, such as distributors, for this type of wine; wine events featuring this type of wine and/or events in the region producing this type of wine; research, such as academic and agricultural resources about this type of wine, the grapes used to make this wine, and the regions where this type of wine is produced; tasting notes for this type of wine; regulations pertaining to the manufacturing, packaging, distribution, and labeling of Barolo wines; maps of the regions that produce this type of wine; and the terroir, or the attributes that regions give to this type of wine.

Similarly, access control 325 is a layered active user interface element that includes additional user interface elements 327 includes a set of region filters that can be applied to narrow the search results to focus on a particular region that produces Barolo wine.

As discussed above, users can select multiple elements to narrow or broaden the set of search results.

Many types of data are organized according to hierarchies. For example, a website may include a home page providing general information as well as one or more sub-pages providing information about specific topics. An embodiment of the invention may arrange search result items according to their respective hierarchical position with respect to other search items. For example, a search item corresponding with a sub-page of a website may be arranged underneath and indented from the search item corresponding with the home page of the website.

An embodiment of the invention includes drill-down user interface elements adapted to indicate hierarchical relationships between search result items and to enable users to navigate to and from related search items.

Figure 4A:
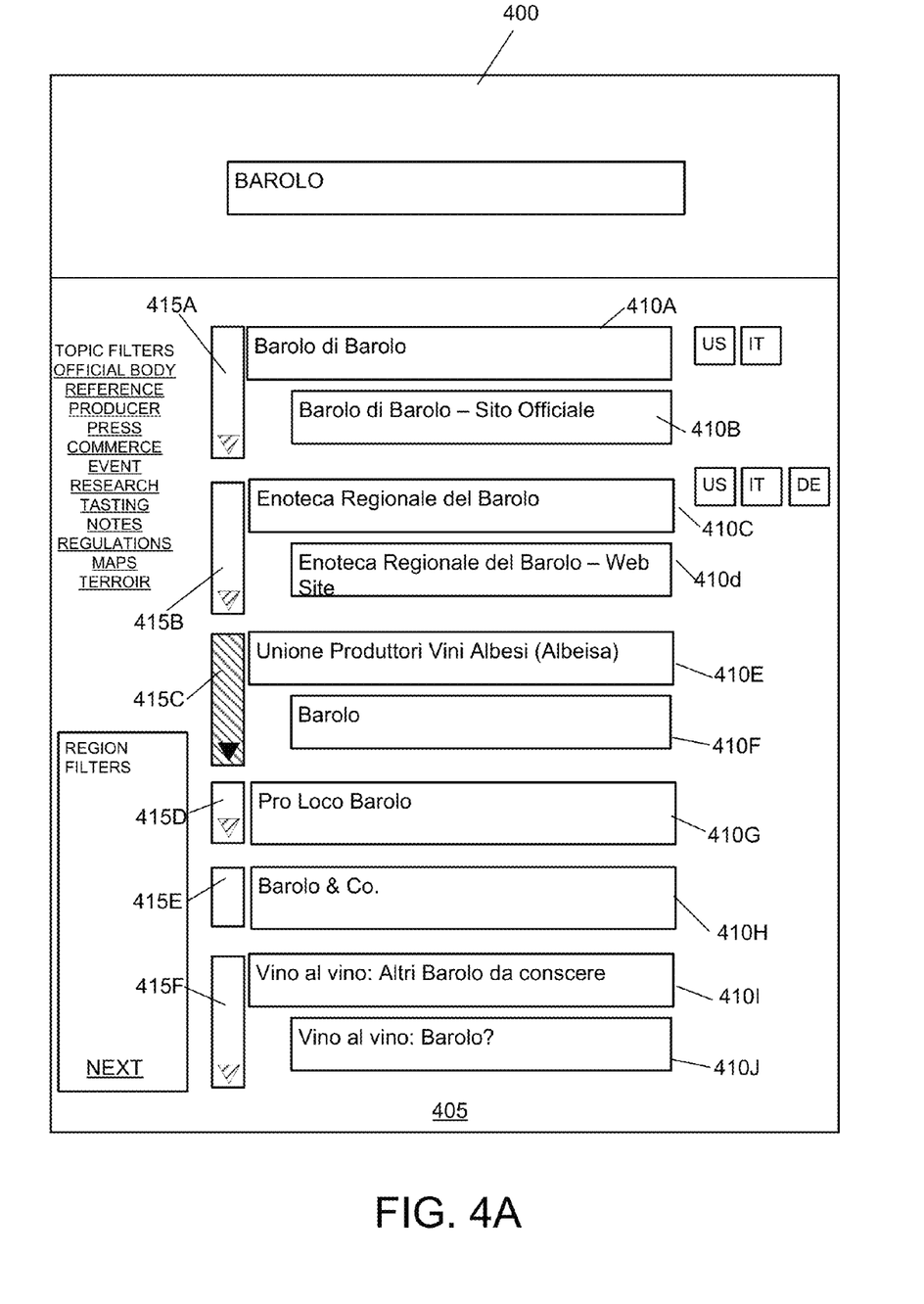
FIGS. 4A and 4B illustrate example drill-down user interface elements according to an embodiment of the invention.

FIG. 4A illustrates an example user interface 400 including drill-down user interface elements according to an embodiment of the invention. Example user interface 400 includes a search results panel 405. Search results panel 405 includes search result items 410a, 410b, 410c, 410d, 410e, 410f, 410g, 410h, 410i, and 410j.

In this example, related search result items are grouped together and indented to indicate their association and hierarchical relationships. For example, search result item 410a, corresponding with a home page of a website, is a parent of search result item 410b, corresponding with a sub-page of the website. Similarly, search result items 410c, 410e, and 410i, corresponding with home pages of different websites, are parents of search result items 410d, 410f, and 410j, respectively.

According to an embodiment of the invention, example user interface 400 includes drill-down user interface elements 415, including elements 415a, 415b, 415c, 415d, 415e, 415f. Drill down user interface elements 415 are each associated with a set of related search result items, each of which may include one or more search items. In an embodiment, each of the drill-down user interface elements 415 is vertically sized to span the height of a group of related search items. For example, drill-down user interface element 415a spans the height of related search result items 410a and 410b. Drill-down user interface element 415d spans the height of search result item 410g. By sizing each of the drill-down user interface elements 415 according to the height of its associated set of related search result items, an embodiment of the drill-down user interface elements provide a visual indication of related search result items.

In an embodiment of the invention, the drill-down user interface elements 415 are active user interface elements. In this embodiment, when a user selects one of the drill-down user interface elements 415, the search results panel 405 displays an expanded set of search result items associated with the selected drill-down user interface element. For example, if a drill-down user interface element 415e, associated with a wine producer website, is selected, then an embodiment of the invention will display additional search result items associated with this website.

Figure 4B:
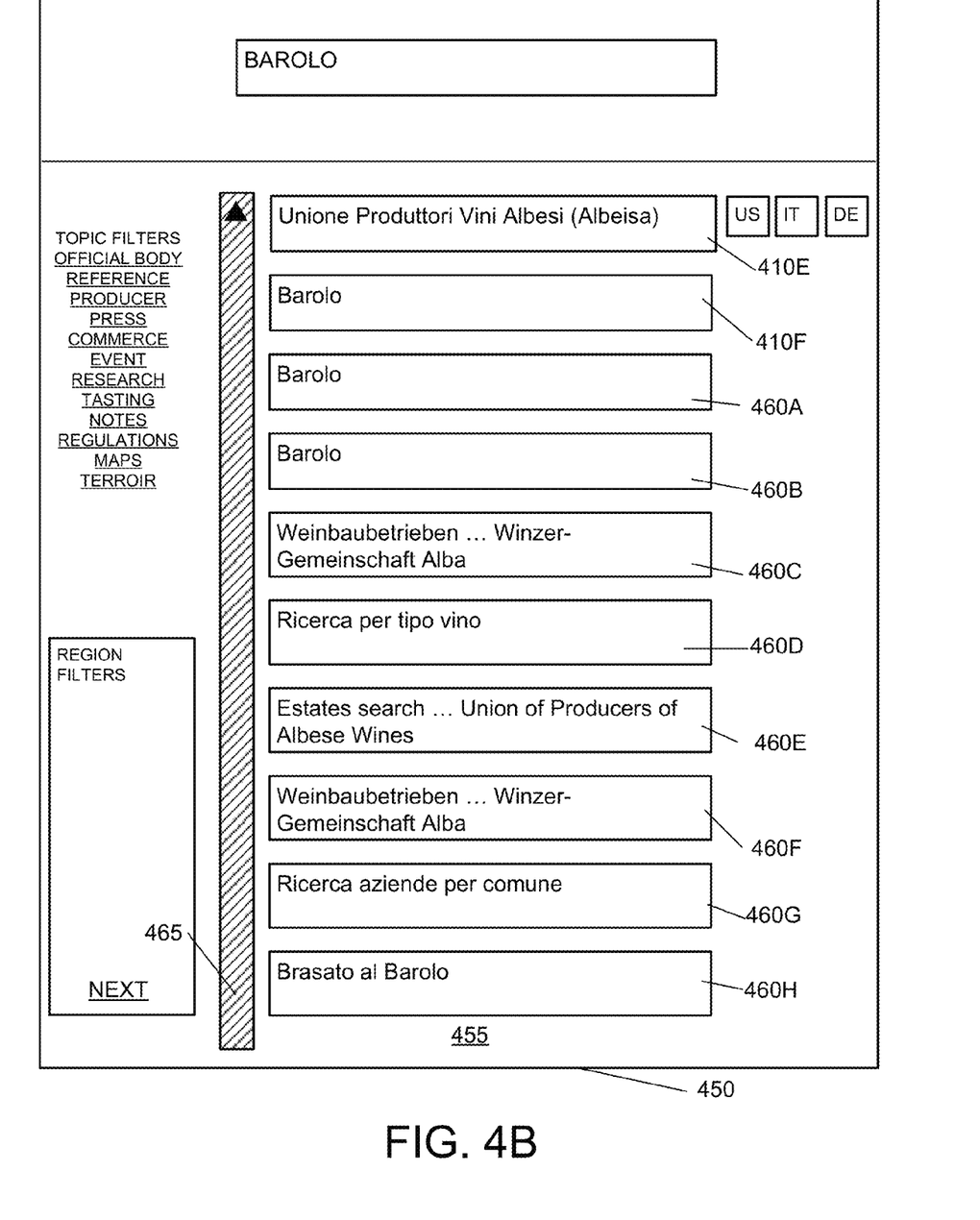

FIG. 4B illustrates an example expanded set of search result items accessed via a drill-down user interface element according to an embodiment of the invention. FIG. 4B illustrates example user interface 450 including a search results panel 455, similar to example interface 400. In response to the selection of drill-down user interface element 415e shown in FIG. 4A, user interface 450 displays an expanded set of search result items in the search results panel 455.

Search results panel 455 includes search result items 410e and 410f, previously presented as a group of related search result items. Search results panel 455 also presents additional search result items 460 associated with the search result items 410e and 410f, including search result items 460a to 460h. In this example search result items 460 are associated with the same website as search result items 410e and 410f.

Additionally, search results panel 455 includes an enlarged version 465 of the drill-down user interface element 415e. The enlarged drill-down user interface element 465 spans at least the height of the expanded set of search result items, including search result items 410e, 410f, and search result items 460. This provides a visual indication that all of these search result items are related. In a further embodiment, selecting the enlarged drill-down user interface element 465 will return to the view of search result items 410 shown in FIG. 4A, removing the additional search result items 460 from the search results panel 455. Embodiments of the invention may use animation or other visual indicators during the transitions between normal and expanded views of search results to assist users in understanding the associations between search result items.

As described above, the drill-down user interface elements provide a visual indication of the associations or hierarchical groupings of search result items. In a further embodiment, the positions of a drill-down user interface element and its corresponding enlarged drill-down user interface element remain in the same relative position. This ensures that when a user selects a drill-down user interface element with a mouse pointer, the corresponding enlarged drill-down user interface element will still be under the mouse pointer. Thus, a user can select a drill-down user interface element to view additional related search result items, such as additional sub-pages of a website, and then select the expanded drill-down user interface element to return to the original set of search result items without moving the mouse pointer.

Embodiments of the invention may be applied to vertical search engines, which are directed to specific topic areas. For vertical search engines, the depth or comprehensiveness of search results is very important. Thus, vertical search engines often desire to index every sub-page within a website. Many simple websites are created using static HTML links. For these types of websites, it is relatively easy to recursively parse the HTML source code of a web page to identify any linked sub-pages. These sub-pages are added to the index and parsed to identify further sub-pages.

Unfortunately, many web pages use dynamically generated links to sub-pages. For example, many web sites uses Javascript or Flash to create visually unique or animated menus of sub-pages. Because these links are generated via script programs associated with the website, traditionally web-crawling techniques cannot identify these types of links to sub-pages.

Embodiments of the invention extract dynamically generated links to sub-pages by evaluating or parsing the program code that generates these links. In an embodiment, a web crawler or other electronic document indexing program retrieves a home page of a web site or other type of hypertext document. The indexing program first analyzes the source code or other type of document markup metadata to identify any static links to additional electronic documents. These links are added to a list of electronic document to be potentially indexed.

Next, the indexing program searches for scripts or other programs associated with the retrieved document. Scripts and programs may be embedded in the document source code or located external to the document source code and referenced by a link. For example, an HTML document may include "<script>" tags that included either embedded script code or a link or reference to an external script or program.

For each identified script or program, an embodiment of the invention uses pattern matching techniques to identify potential dynamic links to additional web pages or other electronic documents. The type of pattern matching will vary depending upon factors such as the programming or scripting language; supporting libraries, APIs, toolkits, and frameworks; and language of the electronic document (e.g. English, French, or Italian).

For example, if a web page includes a script in the Javascript programming language, an embodiment of the invention searches the script code for standard Javascript commands that open windows or change the URL. Additionally, an embodiment of the invention may extract a link to an electronic document by looking for markup tags that include "onclick" attributes, which indicate an action to be performed when a user selects the corresponding portion of the electronic document. For example, if a HTML anchor tag <a> includes an "onclick" attribute, the target of this attribute may be a link to another web page or electronic document.

Examples of pattern matching techniques used by an embodiment of the invention include searching for code that sets the document location to a string constant:

location.href="blah.html";
location="mememe/them"; and
document.location="blah".

The target of code statements such as these are potential links to additional electronic documents.

In another example, an embodiment of an indexing program searches for and evaluates Javascript "onchange" forms to determine URLs to additional electronic documents.

In a further example, an embodiment of the invention may look for user-defined script functions that include keywords typically used by programmers to describe functions that open windows or change URLs. For example, a function entitled "doPopup" may be adapted to open a window. An embodiment of the indexing program will search functions with descriptive names for text strings that appear to be URLs or other references to electronic documents. An embodiment of the invention may search for keywords in multiple languages in functions. For example, "apriFinestra" means "openWindow" in Italian.

For example, function names that include an action word, such as "do,open,create,show,make,ouvre,apri,abre,abrir, oeffnen", depending upon the language, followed often, but not necessarily, by an object word, hinting that this is a window, such as "win,window,page,finestra,browser,ventana, fenster,fenetre,pop,popup" and sometimes with an intervening word, like "a" or "extra". Some words, like "popup", likely indicate an additional electronic document on their own, without an "action word." Examples of these structures include doPopup("myWin.asp"); openWin("something.jsp"); apri("bob.jsp"); popup("myDir/myfile.swf"); and oeffnenfenster("/happywin.html").

For example, an embodiment of the invention searches for functions known to open windows, including built-in functions of scripting languages or common web-browser APIs and common libraries. Examples of this include:

```
window.open("mydocument");
MM_openBrWindow("someotherdoc");    // dreamweaver
new SWFObject("menufile.swf");      // common flash detector
``` and embed script

In this example, an embodiment of the invention may attempt to determine that the string constant extracted from a pattern is a relative or absolute URL and not a symbolic identifier. This can be done by searching for characters within the string, such as file extensions or slash characters, that are specific to URLs and illegal or rare in symbolic object names. Even if this embodiment occasionally misidentifies a symbolic object name as a URL, the relative cost of attempting to index an invalid link is outweighed by the number of additional electronic documents correctly identified.

In still a further example, an embodiment of the invention looks for patterns associated with commonly used menu or user interface libraries. For example, Dreamweaver, Coolmenus, and Sothink are common menu libraries used by web site designers to create dynamic menus. An embodiment of the invention looks for standard functions and code patterns generated by these menu libraries and extracts the text and link associated with each menu item. These links and associated text are used to identify and potentially index additional electronic documents. An embodiment of the invention also uses the associated text extracted from a menu to determine the type of content on the associated electronic document.

Examples of patterns used by common menu libraries include:
Dreamweaver:
mm_menu_0445533726_0.addMenuItem("Kazakhshtan", "location='kazakhstan.html'");

(Note in this example that the second item here is a string literal indicating an action. As a result, an embodiment of the invention passes the string literal recursively through the link extraction algorithm to identify the link associated with this action.

Sothink:
stm_aix("p0i2","p0i0",[0,"Kiosk Range","","",-1,-1,0,"hardware-solution.asp","_self","","Hardware Solutions","","",0,0,0,"arrow_r.gif","arrow_r.gif",7,7]);

Coolmenus:
cmMenu.makeMenu('ma3',x,'Finland','/finland/company/link.shtml?navid=3');

Although the above examples describe pattern matching techniques used to identify dynamic links within Javascript scripts, embodiments of the invention are similarly applicable to any other programming or scripting language. Additionally, embedded multimedia objects, such as the objects, websites, and other content created using Adobe Flash standard and/or Actionscript can be processed in a similar manner to identify potential links to additional electronic documents.

Additionally, for embedded objects and scripts, an embodiment of the invention takes into account the context of the parent page to evaluate relative paths. For example, if an embedded object, such as a Flash object, refers to a path of another electronic document, the path specified may be relative to the parent page. Thus, an embodiment of the invention adds the path of the parent page to the relative path of a linked electronic document to determine the absolute path of the electronic document for use in indexing the electronic document. A further embodiment of the indexing application automatically downloads and caches embedded objects as part of parsing the parent page.

A further embodiment of the invention may include a scripting language interpreter that is capable of parsing all or portions of scripting language code. In this embodiment, the interpreter may be used to evaluate variables and expressions to determine paths to additional electronic documents. For example, an embodiment of the interpreter may trace script execution flow to identify symbolic names and evaluate variables and expressions. Additionally, an embodiment of the interpreter may execute the script to evaluate variables and expressions.

Figure 5:
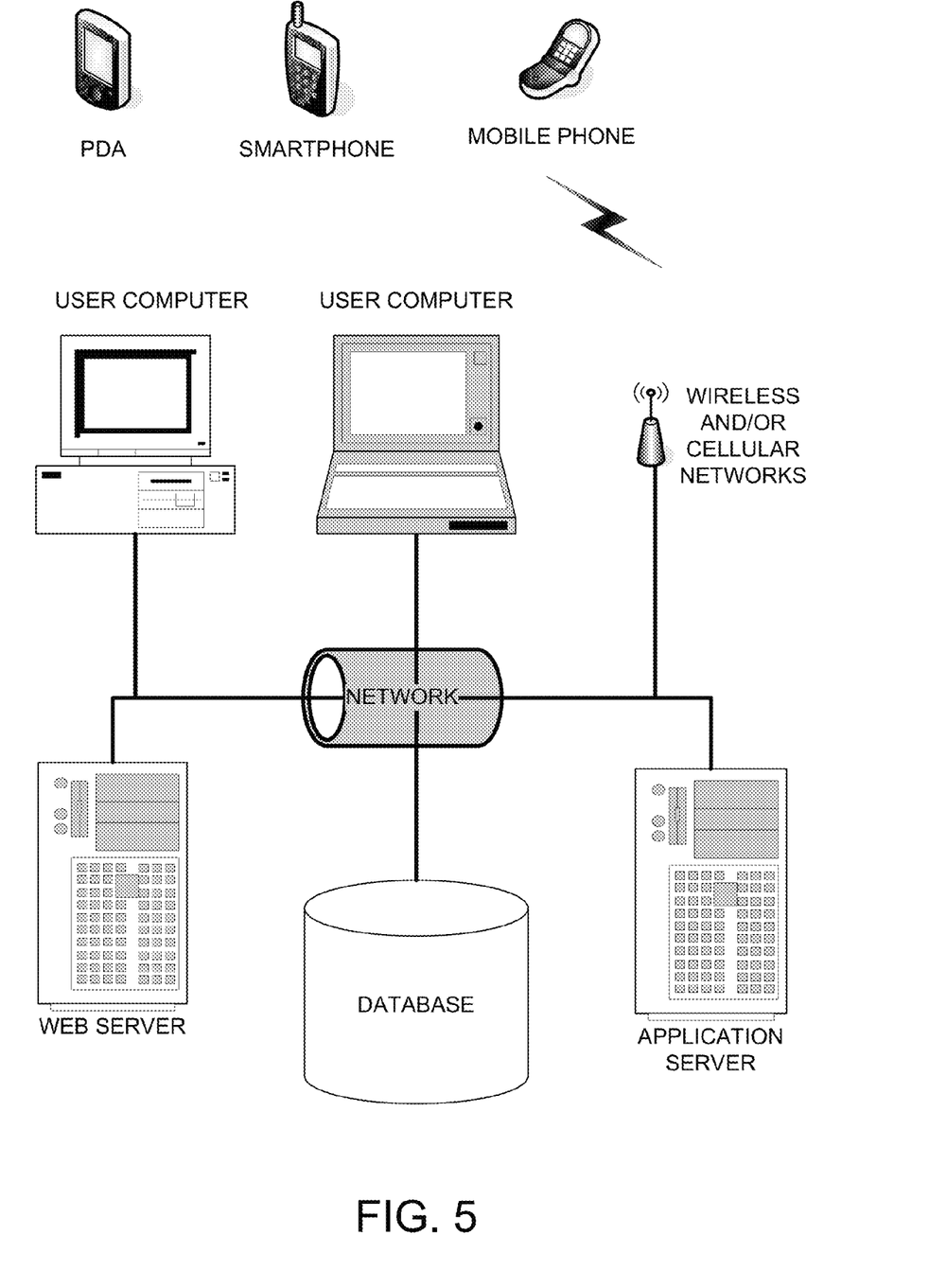
FIG. 5 illustrates an example system architecture suitable for implementing an embodiment of the invention.

FIG. 5 illustrates an example system architecture suitable for implementing an embodiment of the invention. The system includes user computers including portable and desktop personal computers, personal digital assistants, smartphones, and mobile phones. The system can interface with any type of electronic device, such as a thin-client computer, Internet-enabled mobile telephone, mobile Internet access device, electronic book, or personal digital assistant, capable of displaying and navigating web pages or other types of electronic documents. Although system is shown with five user computers, any number of user computers can be supported.

A web server is used to process requests from web browsers and standalone applications for web pages, electronic documents, social media networking service content, and other data from the user computers. The web server may also provide syndicated content, such as RSS or Atom feeds, of data.

Application server operates one or more data applications. The data applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails or .NET.

The data applications on application server process input data and user computer requests and can store or retrieve data from database. Database stores data created and used by the enterprise. In an embodiment, the database is a relational database, such as MySQL, that is adapted to store, update, and retrieve data in response to SQL format commands. The application server may also scan or crawl other web sites to find and analyze web sites and other data pertinent to the user application. The results of this analysis may be stored in the database or in other types of data storage.

In an embodiment, the application server is one or more general purpose computers capable of executing programs or scripts. In an embodiment, the web server is implemented as an application running on one or more general purpose computers. The web server and application server may be combined and executed on the same computers.

An electronic communication network enables communication between user computers, web server, application server, and database. In an embodiment, network may further include any form of electrical or optical communication devices, including wireless and wired networks. Network may also incorporate one or more local-area networks, such as an Ethernet network; wide-area networks, such as the Internet and cellular carrier data networks; and virtual networks, such as a virtual private network.

The system is one example for executing data applications according to an embodiment of the invention. In another embodiment, application server, web server, and optionally database can be combined into a single server computer application and system. In alternate embodiment, all or a portion of the web server and application functions may be integrated into an application running on each of the user computers. For example, a JavaScript application on the user computer may be used to retrieve or analyze data and generate display portions of the applications.

Figure 6:
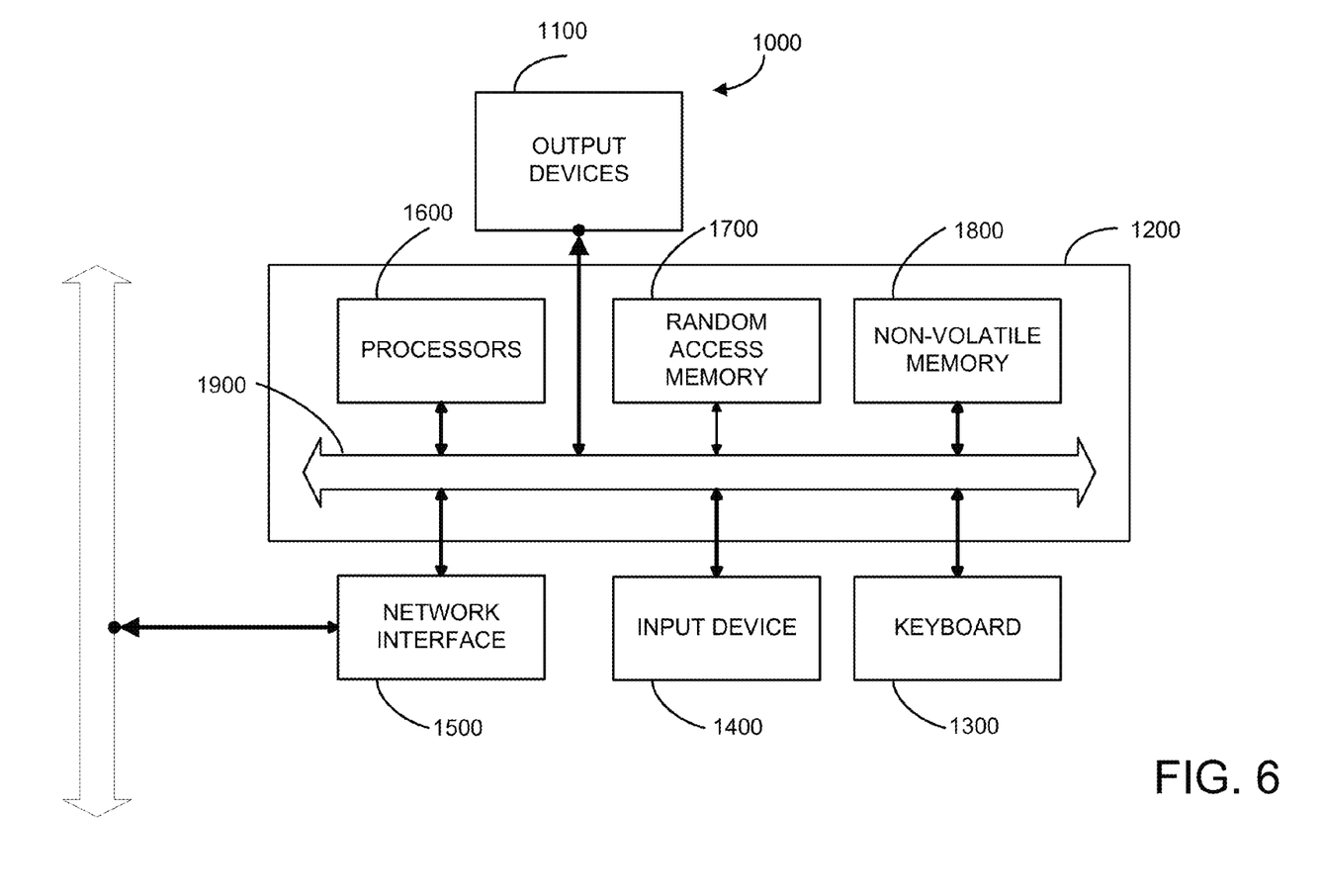
FIG. 6 illustrates an example computer system suitable for use with an embodiment of the invention.

FIG. 6 illustrates an example computer system suitable for use with an embodiment of the invention. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; a computer 1200; a keyboard 1300; input devices 1400; and a network interface 1500. Input devices 1400 can include a computer mouse, a trackball, joystick, track pad, graphics tablet, single or multitouch touch screens, microphone, various sensors, and/or other wired or wireless input devices that allow a user or the environment to interact with computer system 1000. Embodiments of network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 can include embodiments of the above described processors, such as processors 100, 150, and 400.

RAM 1700 and non-volatile memory 1800 are examples of tangible media for storage of data, audio/video files, computer programs, applet interpreters or compilers, virtual machines, and embodiments of the herein described invention.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of analyzing a web page to identify and extract associated electronic documents, the method comprising:
    retrieving first web page code representing a first web page, wherein the web page code includes a reference to script code adapted to be executed by a web browser displaying the first web page;
    analyzing at least one of the web page code or document markup metadata to identify at least one static link;
    analyzing the script code to identify at least one potential dynamic link dynamically generated during the execution of the script code;
    determining a network location corresponding with each of the potential dynamic links;
    adding the network location to a list of potential electronic documents to index;
    accessing the network location to determine if there is an electronic document available to retrieve; and
    in response to the determination that there is an electronic document available to retrieve, retrieving the electronic document;
    wherein analyzing the script code to identify the dynamic link includes utilizing pattern matching including identifying the dynamic link based on a portion of the script code near the dynamic link, determining a language associated with the content of the first web page and selecting a pattern adapted to the language for identifying at least one keyword in the script code in the language that indicates the dynamic link, identifying the potential link based on a string constant in the script code, analyzing the script code using a script language interpreter, and evaluating a script code expression and/or variable.

2. The method of claim 1, comprising:
    determining if the electronic document includes a second reference to an additional script code;
    in response to the determination that the electronic document includes the second reference, repeating the steps of analyzing the script code and determining the network location for the additional script code to identify a second network location corresponding with a second potential link.

3. The method of claim 1, wherein the portion of the script code includes at least one word associated with a window or page.

4. The method of claim 1, wherein the portion of the script code includes a reference to a function included in a scripting language, a web-browser application programming interface (API), and/or a code library.

5. The method of claim 4, wherein the code library includes a user interface library.

6. The method of claim 4, wherein the code library includes a menu library.

7. The method of claim 1, wherein the string constant includes at least one character frequently associated with network locations.

8. The method of claim 1, wherein the potential link includes a portion of a network location.

9. The method of claim 8, wherein the portion of the network location includes a relative path.

10. The method of claim 9, wherein determining the network location corresponding with the potential link comprises:

adding a parent path to the relative path to determine the network location.

11. The method of claim 1, wherein evaluating the script code expression comprises:

tracing execution flow of the script code.

12. The method of claim 1, wherein evaluating the script code expression comprises:

executing at least a portion of the script code.

13. The method of claim 1, wherein the script code is embedded in the first web page code.

14. A method of analyzing a web page to identify and retrieve associated electronic documents, the method comprising:

retrieving first web page code representing a first web page, wherein the web page code includes a reference to script code adapted to be executed by a web browser displaying the first web page;

analyzing the script code to identify at least one potential dynamic link dynamically generated during the execution of the script code, including utilizing pattern matching including identifying the dynamic link based on a portion of the script code near the dynamic link, determining a language associated with the content of the first web page and selecting a pattern adapted to the language for identifying at least one keyword in the script code in the language that indicates the dynamic link, identifying the potential link based on a string constant in the script code, analyzing the script code using a script language interpreter, and evaluating a script code expression and/or variable; and determining a network location corresponding with the potential dynamic link.

* * * * *